(12) United States Patent
LaPerch

(10) Patent No.: US 7,519,362 B2
(45) Date of Patent: Apr. 14, 2009

(54) PERSONAL WIRELESS GATEWAY AND METHOD FOR IMPLEMENTING THE SAME

(76) Inventor: Richard C. LaPerch, 5440 W. Ridge View Dr., Fairfax, VA (US) 22030

(*) Notice: Subject to any disclaimer, the term of this patent is extended or adjusted under 35 U.S.C. 154(b) by 501 days.

(21) Appl. No.: 11/222,898

(22) Filed: Sep. 9, 2005

(65) Prior Publication Data

US 2006/0079280 A1 Apr. 13, 2006

Related U.S. Application Data

(60) Provisional application No. 60/609,527, filed on Sep. 13, 2004.

(51) Int. Cl.
*H04Q 7/20* (2006.01)

(52) U.S. Cl. .......... 455/426.2; 455/556.1; 455/555; 455/404.2; 455/405; 455/550.1; 455/573; 455/343.5; 455/41.1; 455/456.1; 370/328; 370/401; 379/219; 379/45

(58) Field of Classification Search . 455/422.1–426.21, 455/428, 445, 404.1–404.2, 418–420, 550.1–557, 455/456, 456.1–457, 403, 405, 571–574, 455/343.1–343.5, 41.2; 370/328, 338, 401, 370/395.52, 352, 359.52; 379/219, 45, 88.17, 379/93, 142.1, 93.01; 709/226, 229, 223–224
See application file for complete search history.

(56) References Cited

U.S. PATENT DOCUMENTS

| | | | | |
|---|---|---|---|---|
| 7,263,102 | B2 * | 8/2007 | Kreiner et al. | 370/401 |
| 7,289,489 | B1 * | 10/2007 | Kung et al. | 370/352 |
| 2003/0027565 | A1 * | 2/2003 | Bossemeyer et al. | 455/422 |
| 2003/0083081 | A1 * | 5/2003 | Sanders et al. | 455/466 |
| 2003/0169727 | A1 * | 9/2003 | Curry et al. | 370/352 |
| 2004/0033786 | A1 * | 2/2004 | Kirkpatrick | 455/74.1 |
| 2004/0235455 | A1 * | 11/2004 | Jiang | 455/411 |
| 2004/0248594 | A1 * | 12/2004 | Wren, III | 455/465 |
| 2005/0083911 | A1 * | 4/2005 | Grabelsky et al. | 370/352 |
| 2005/0089052 | A1 * | 4/2005 | Chen et al. | 370/401 |

(Continued)

*Primary Examiner*—Kamran Afshar
(74) *Attorney, Agent, or Firm*—Roberts Mardula & Wertheim, LLC (57) ABSTRACT

A personal wireless gateway (PWG) comprises a host controller that bridges telecommunications devices using different transmission media allowing a telecommunications device designed for a particular media to be used to communicate over any other available media. Corded and cordless plain old telephones (POTS) may initiate and receive telephone calls over the public switched network (PSTN) or may be bridged to a mobile telephone to initiate and receive telephone calls via the mobile telephone network. A telephone configured for voice over IP (VoIP) may initiate and receive telephone calls via a broadband connection, the PTSN, or a mobile telephone network. A broadband connection may also be used to support high-speed data exchange between the Internet and one or more computer (e.g., laptop, general purpose computer, personal data assistant) via a wireless LAN or via a mobile telephone connected to a wireless data network The PWG is adapted to provide the location of the PWG to an emergency assistance service when an emergency assistance number is called from any device during predefined intervals and/or if the caller is unable to speak. Additionally, the PWG provides devices without fixed locations the attribute of a known location. The location information may be stored expressly by the user or gleaned from the user profile information. By way of illustration and not as a limitation, the emergency assistance service may be a "911" operator.

36 Claims, 7 Drawing Sheets

U.S. PATENT DOCUMENTS

2005/0144251 A1* 6/2005 Slate .......................... 709/215
2005/0249344 A1* 11/2005 Mueller et al. ......... 379/207.15
2007/0002835 A1* 1/2007 Church et al. ............... 370/352

* cited by examiner

PERSONAL WIRELESS GATEWAY AND METHOD FOR IMPLEMENTING THE SAME

RELATIONSHIP TO PRIOR APPLICATIONS

This application claims priority from Provisional Patent Application No. 60/609,527 filed Sep. 13, 2004.

BACKGROUND

The telecommunications market has seen tremendous change since the passage of the 1996 Telecom Reform act. This change slowed somewhat during the early part of this decade but with the economy back in high gear, change is accelerating. The wireless market appears to be one of the recipients of this improvement. Over the past few years, over 4 billion minutes have left the fixed networks and moved onto the wireless networks. Many analysts feel this trend will not only continue, but accelerate, with the advent of new technologies that will level the playing field between fixed and wireless.

Adding complexity to this equation, over 20-million households in America now have broadband connectivity. The penetration rates in other parts of the world are even higher. For example, Korea has over a 50% penetration rate for broadband. With the advent of broadband, the much-ballyhooed arrival of the low cost, fully featured VoIP telephony services finally seems to be coming to fruition. Comcast Cable plans to have VoIP available to half of its subscribers by the end of 2005 and the rest by the completion of 2006. AT&T, with its VoIP offering, is challenging upstarts such as Vonage to roll out very low cost phone service using the broadband connection. Recent regulatory issues in the US will most likely accelerate this trend. With the courts invalidating the FCC rules on wholesale, many of the companies like MCI and AT&T that are leasing the RBOCs local lines to provide their own branded service, are contemplating exiting the local POTS business. Yet they are keenly aware that they need to offer their customers bundled services that will drive them to VoIP over broadband.

Despite all these advances in the telecom world, consumers still maintain separate phone numbers and, most often, a fixed and mobile line. This in part has been the catalyst in driving up the amount consumers spend on telecom costs. While there is a significant trend amongst a younger generation to abandon a landline (eight million at the end of 2003 relied solely on their mobile phone), many consumers are looking for ways to reduce their telecom costs and simplify their communications. While wireless seems to be gaining the upper hand, the wireless carriers still have some challenges to confront. In order to provide better service, carriers deploy additional network infrastructure to meet the growing needs of the increased user population and traffic. Complicating this challenge is the burden incurred from the acquisition of the 3G licenses, which have put many of the wireless carriers in difficult financial positions. In an effort to capture more customers and improve service, carriers have been exploring new ways to deliver service in those areas that have been hard to reach.

The most prominent of these hard to reach areas is often times the home or small business premise. The use of the mobile phone has increased dramatically over the past 4 years and home use now accounts for over 20% of the usage. Yet, many consumers still find it inconvenient or not reliable enough to consider utilizing the mobile phone as the exclusive home communications device. Consider the following issues that have been identified for users of mobile phones in the home or small business:

Reception is spotty and often consumers are compelled to move to that "one good spot" for clear reception in the home/office.

The mobile phone is frequently sitting in a cradle or other charger while in the home, and therefore cannot be transported while being charged.

The ergonomics of the mobile phone are not as pleasing as the traditional corded/cordless phones for the home and office.

One often cannot hear the mobile phone ring since it is located in another room or left in an auto.

Many minutes go unused due to the inconvenience of the mobile phone, thus increasing the incremental cost of telecom usage.

Consequently, many mobile subscribers use the landline at home and leave many of the minutes on their mobile phone unused and under-utilize the "free" minutes after hours or on weekends.

The rapid evolution of the wireless market place has accelerated with the advent of the "free" bandwidth spectrum. Wi-Fi®, Bluetooth®, Wi-Max and others have capitalized on this spectrum to offer consumers new approaches to access the Internet. The proliferation of mobile phones has finally surpassed the number of fixed lines in the world. This majority will continue to grow over the next several years as the youngest generation matures within the culture of the wireless revolution. Many consumers also are looking to have a single "identity" unrelated to the device of their choosing, from which they can communicate.

A problem for telecommunications consumers generally is accommodating innovation in an "un-tethered" world while maintaining the quality, reliability and convenience that many consumers have come to expect with the fixed networks.

What would be useful are means to provide the consumer or small business owners the ability to leverage their investment in their mobile technology and usage by interconnecting telecommunications devices using different transmission media. Such means would provide telecommunications devices using wireless protocols, such as Wi-Fi and Bluetooth, to provide connectivity to wired or wireless telecommunications devices.

SUMMARY

In an embodiment, a personal wireless gateway (PWG) comprises a host controller that bridges telecommunications devices using different transmission media allowing a telecommunications device designed for a particular media to be used to communicate over any other available media. By way of illustration and not as a limitation, a corded and cordless plain old telephones (POTS) may initiate and receive telephone calls over the public switched network (PSTN) or may be bridged to a mobile telephone to initiate and receive telephone calls via the mobile telephone network. A telephone configured for voice over IP (VoIP) may initiate and receive telephone calls via a broadband connection, the PTSN, or a mobile telephone network. A broadband connection may also be used to support high-speed data exchange between the Internet and a computer (e.g., laptop, general purpose computer, personal data assistant) via a wireless LAN or via a mobile telephone connected to a wireless data network.

The PWG comprises a software implementation of a host controller that converts communications sent in one wireless protocol (e.g., WI-FI, Bluetooth) to another protocol for reception by a selected receiving device. The host controller also routes communications between devices based on user-established rules. Additionally, the host controller supports rollover of a call to the mobile Web, to a VoIP telephone, to a broadband connection, or to a landline (PSTN connection). Additionally the host controller supports the interface over the internet to a carrier's switching and billing systems. The connections can be used to initiate features on the switch such as call forwarding when a mobile phone registers with the PWG. It also will interface to the billing system so as to allow a carrier to provide billing based on proximity to the PWG or "zone pricing".

In an embodiment, a PWG is connected to the wiring of a dwelling. The inside wiring connects corded and cordless plain old telephones (POTS) to the PSTN using analog voice and signaling techniques and VoIP-enabled telephones to wireless broadband servers using packet-based protocols. The PWG comprises wireless interfaces that allow a wireless telecommunications device (e.g., mobile telephones) to receive communications from the PWG via a wireless protocol thereby enabling POTS and VoIP communications devices to originate calls for transport over the mobile telephone network and to receive calls originated on the mobile telephone network.

The interface to the inside wiring provides multiple POTS extensions and VoIP extensions to communicate internally. The separate extensions are capable of not only making and receiving calls from any of the external networks (i.e. wireless, VoIP) but also are able to call the other internal extension. Each extension answers any incoming phone calls or places outbound calls while the other extension remains available for use. For example if extension 1 and 2 are present and a call comes in from the wireless network the call is answered on extension 1, then extension 2 is still available to make and receive calls.

In yet another embodiment, the management subsystem provides the location of the PWG to an emergency assistance service when an emergency assistance number is called from any device. Additionally, this embodiment provides devices without fixed locations the attribute of a known location. By way of illustration and not as a limitation, a device without a fixed location may include a POTS telephone when used to communicate over a transmission media other than the PSTN, a mobile telephone and a VoIP telephone. The location information may be stored expressly by the user or gleaned from the user profile information. By way of illustration and not as a limitation, the emergency assistance service may be a "911" operator. In another embodiment, a text to speech (TTS) service is utilized to deliver the information to the emergency assistance if the voice greeting with the same information is not available. The TTS server could pull this information from the PWG management information or a centralized database containing this information for the subscriber.

It is an aspect to facilitate the use of diverse communications devices with a residential or business network.

It is another aspect to permit telecommunications devices utilizing VoIP or traditional POTs to receive a call originated on a mobile telephone.

It is yet another aspect to permit telecommunications devices utilizing VoIP or traditional POTs to originate a call that will be carried over a mobile telephone network.

It is still another aspect to provide access to wireless broadband on WANs. It is an aspect to provide roll-over capabilities from one communication device to another, based on time of day, quality of service, or other parameters established by the subscriber, independent of the media of the originating and answering communications device.

It is another aspect to identify a subscriber with a single number of his or her choosing without regard to the technology used by the telecommunications device used to make or receive a call.

In is another aspect to allow the users of the PWG to download ringtones to the host controller that will be played based on a potential list of criteria such as called party and calling party.

DETAILED DESCRIPTION

The following terms are used in the description that follows. The definitions are provided for clarity of understanding:

API—Application program interface.
    Blue Tooth—A short-range radio technology aimed at simplifying communications among Internet devices and between devices and the Internet. It also aims to simplify data synchronization between Internet devices and other computers. Bluetooth is a trademark of Bluetooth SIG, Inc.
    POTS—Plain old telephones.
    PSTN—Public switched telephone network.
    VoIP—Voice over Internet protocol.
    Wi-Fi.®.—Wireless Fidelity. Refers to any type of 802.11 network, whether 802.11b, 802.11a, dual-band, etc. WiFi is a trademark of the Wi-Fi Alliance.

In an embodiment, a personal wireless gateway (PWG) comprises a host controller that bridges telecommunications devices using different transmission media allowing a telecommunications device designed for a particular media to be used to communicate over any other available media. By way of illustration and not as a limitation, a corded and cordless plain old telephones (POTS) may initiate and receive telephone calls over the public switched network (PSTN) or may be bridged to a mobile telephone to initiate and receive telephone calls via the mobile telephone network. A telephone configured for voice over IP (VoIP) may initiate and receive telephone calls via a broadband connection, the PTSN, or a mobile telephone network. A broadband connection may also be used to support high-speed data exchange between the Internet and a computer (e.g., laptop, general purpose computer, personal data assistant) via a wireless or wired LAN or via a mobile telephone connected to a wireless data network.

The PWG comprises a host controller, which comprises software that converts communications sent in one wireless protocol (e.g., Wi-Fi, Bluetooth) to another protocol for reception by a selected receiving device. The host controller also routes communications between devices based on user-established rules.

The PWG comprises a software implementation of a host controller that converts communications sent in one wireless protocol (e.g., WI-FI, Bluetooth) to another protocol for reception by a selected receiving device. The host controller also routes communications between devices based on user-established rules. Additionally, the host controller supports rollover of a call to the mobile Web, to a VoIP telephone, to a broadband connection, or to a landline (PSTN connection). The PWG comprises wireless interfaces that allow a wireless telecommunications device (e.g., mobile telephones) to receive communications from the PWG via a wireless protocol thereby enabling POTS and VoIP communications devices to originate calls for transport over the mobile telephone network and to receive calls originated on the mobile telephone network.

In yet another embodiment, the PWG provides the location of the PWG to emergency operators when "911" is called from any device. Additionally, this embodiment provides devices without fixed locations the attribute of a known location. By way of illustration and not as a limitation, a device without a fixed location may include a POTS telephone when used to communicate over a transmission media other than the PSTN, a mobile telephone and a VoIP telephone.

Figure 1:
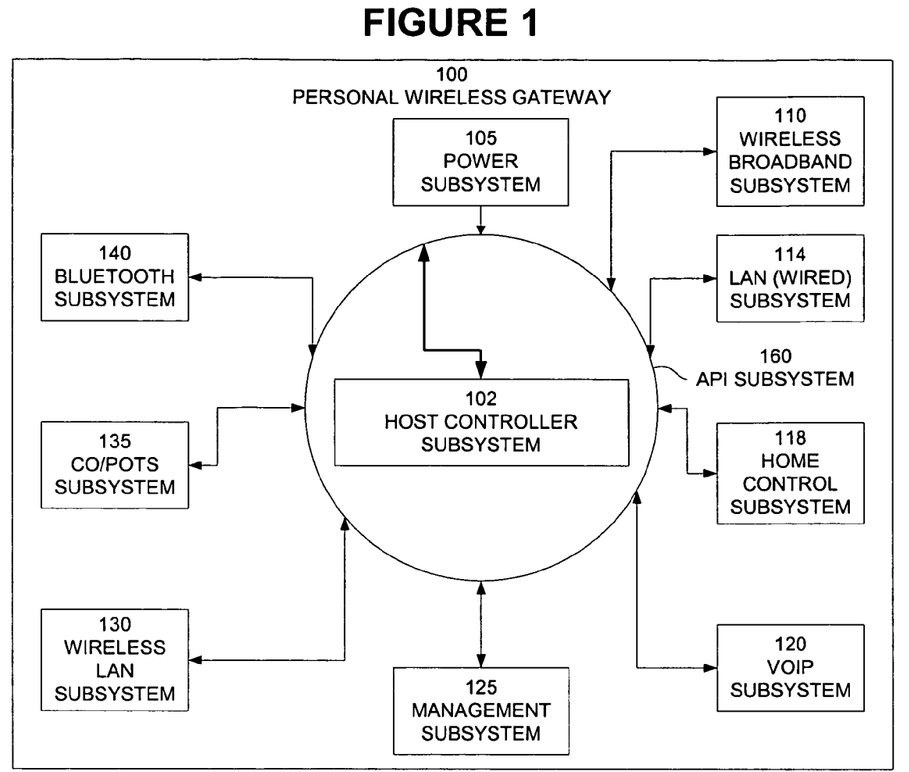
FIG. 1 illustrates the logical components of a personal wireless gateway according to an embodiment.

FIG. 1 illustrates the logical components of a personal wireless gateway according an embodiment. Referring to FIG. 1, a personal wireless gateway 100 comprises host controller subsystem (HCS) 102, a power subsystem 105, a wireless broadband subsystem 110, a LAN (wired) subsystem 114, a home control subsystem 118, a VoIP subsystem 120, a management subsystem 125, a wireless LAN subsystem 130, a CO/POTS subsystem 135, a Bluetooth subsystem 140, and an API subsystem 160.

The HCS 102 communicates via API subsystem 160 to the communications subsystems (110, 114, 118, 120, 130, 135, and 140) and the management subsystem 125 to enable a telecommunications device designed for a particular media to be used to communicate over any other available media. In an embodiment, API subsystem 160 comprises a single API or multiple APIs.

The HCS 102 comprises a central processing node for the PWC 100. In an embodiment, the HCS 102 comprises a Pentium®-class CPU running an embedded LINUX™OS (not illustrated). However, this is not meant as a limitation. As will be appreciated by those skilled in the art, other processors and operating systems may be used without departing from the scope hereof. The HCS 102 further comprises software that provides logic and instructions so as to permit communications between the various subsystems and communications devices. Additionally, the HCS 102 controls the API subsystem 160 that enables communications to the HCS software.

In an embodiment, the HCS 102 supports a power failure safeguard mechanism such as battery holdover for short duration outages and longer-term holdover mechanisms such as flash memory storage of system and configuration data. The HCS 102 automatically reboots on power restoration.

Power subsystem 105 provides power to all subsystems of the PWG 100. In an embodiment, power subsystem 105 comprises an AC transformer/converter compatible with both US and European electrical systems. The transformer/converter provides DC power to PWG 100 via a single prong male connector.

Wireless broadband subsystem 110 provides connectivity to wireless broadband services offered by third parties. By way of illustration and not as a limitation, wireless broadband subsystem 110 provides an interface to broadband wireless networks such as Universal Mobile Telecommunications System (UMTS) compliant modem and other compatible "3G" data networks as well as unlicensed broadband networks such as WiMax and Zigbee.

Wireless LAN subsystem 130 comprises a wireless access point for PWG 100. In an embodiment, wireless LAN subsystem 130 provides connectivity to WI-FI compliant devices. Wireless broadband subsystem 110 further comprises a network address translation (NAT) router and a DHCP server that issues private IP addresses to network devices (computers, laptops, PDAs, VoIP gateways to name a few) allowing these devices to share the wireless broadband subsystem 110.

Management subsystem 125 is utilized by both the subscriber and a system administrator. Management subsystem 125 enables a communications device to detect and register a mobile phone over a Bluetooth connection, configure TCP/IP ports, configure a NAT router and a DHCP server, and enable forwarding of mobile calls, and enables communication with a carrier's network and back office system to enable features on the mobile phone. Management subsystem 125 comprises a data store for storing user information, and user preferences (for example, ring tones and inbound and outbound call routing). In an embodiment, management subsystem provides the location of the PWG to an emergency assistance service when an emergency assistance number is called from any device. Additionally, this embodiment provides devices without fixed locations the attribute of a known location. By way of illustration and not as a limitation, a device without a fixed location may include a POTS telephone when used to communicate over a transmission media other than the PSTN, a mobile telephone and a VoIP telephone. The location information may be stored expressly by the user or gleaned from the user profile information. By way of illustration and not as a limitation, the emergency assistance service may be a "911" operator.

In yet another embodiment, Bluetooth subsystem 140 monitors the external mobile network signal strength and mobile phone battery strength of a Bluetooth compliant mobile telephone and reports the current measurement to management subsystem 125. Management subsystem 125 applies rules to determine the behavior of incoming and outgoing calls depending on the current external mobile network signal or battery strength. By way of illustration and not as a limitation, if the external mobile network signal strength of the mobile telephone is below a pre-determined first threshold, the management subsystem directs the mobile telephone to issue a forwarding command to the external mobile network to forward calls to a specified number. The forwarding command is cancelled if the signal strength improves to a second threshold value. Additionally, the management subsystem 125 issues an alert to the user that forwarding has been invoke or canceled. In an embodiment, the alert comprises an audio tone or a visual signal. In still another embodiment, the management subsystem 125 rings a communications device connected to the PWG 100 and plays an audio message in a selected language.

In yet another embodiment, if the signal strength of the external mobile network is below the first threshold, outbound calls are directed away from the mobile telephone and placed over a different communications device.

The CO/POTS subsystem 135 comprises 2-wire interfaces (RJ-11s) that enable connection to the PSTN or to a POTS device. In an embodiment, a CO/POTS subsystem 135 comprises two RJ-11 interfaces. A first RJ-11 interface is available for connection to the PSTN (FXO/FXS) and a second RJ-11 interface is connected to the inside wiring. Both RJ-11 interfaces may connect to the inside wiring if no CO line is present. When an RJ-11 interface is connected to a CO line, the CO/POTS subsystem 135 detects the presence of CO-provided power and automatically implements the following capabilities:

Provide support for analog voice to and from the PSTN

Receive on-hook/off-hook information from a station and present an off-hook command to the PSTN on demand Detect ringing and other conditions and present the information to the station connection Pass all DTMF, flash, and on-hook/off-hook signaling generated at the station to the PSTN Detect and support CLASS features such as caller ID, 3-way calling, call waiting, etc.

In this embodiment, when an RJ-11 interface is connected to a station (e.g., POTS or a cordless telephone) the CO/POTS subsystem 135 detects the absence of power and implements the following station interface capabilities:

Provide support for 2-way analog voice to the station end

Provide ringing current to the station

Detect on-hook/off-hook states and provide dial tone to the station

Provide support for DTMF signaling to and from the station

Provide echo cancellation

Provide support for CLASS features such as Caller ID, 3-way calling, call waiting, etc.

Provides gain enhancement capabilities which will enable to user of the VoIP or PSTN phones 235 to increase the volume of the call to compensate for the degradation of the wireless or VoIP call.

In addition, the CO/POTS subsystem 135 determines when power to the PWG 100 is not present and to provide a POTS/station line connection to a CO line to allow for PSTN calling. When power is restored to the PWG 100, the CO/POTS subsystem 135 maintains calls in progress.

The Bluetooth subsystem 140 comprises a Bluetooth protocol stack, radio and a processor that convert voice and data per the most recent Bluetooth specification. In an embodiment, Bluetooth subsystem 140 is complaint with Bluetooth specification version 1.2.

In another embodiment, Bluetooth subsystem 140 comprises a plurality of Bluetooth protocol stacks to permit the PWG 100 to backward compatible with Bluetooth enabled mobile phones while remaining compatible with the most current mobile phones that incorporate a Bluetooth feature.

In an embodiment, the Bluetooth subsystem 140 communicates with the HCS 102 via a defined API that is capable of at least seven simultaneous phone connections with a maximum range of range of 30 meters. This is however, but one example and is not meant as a limitation in either the number of phone calls supported or the range of those phone calls.

An API subsystem 160 manages connectivity between the various subsystems and the HCS 102. Commonality is desired in the API(s) and ideally a single API would be utilized to interconnect all current and future subsystems. In an embodiment, the API(s) are simple, high-level and loggable.

Home control subsystem 118 allows devices within the home to be controlled remotely by commands sent from HCS 102. The Home control subsystem connects to various appliances and home entertainment systems through the PWG over the internal wired or wireless network to control these devices. In an embodiment the user accesses, thorough, the PWG, the home entertainment system to initiate a recording of a movie on a satellite network.

In another embodiment, the PWG offers the ability to display call information on the TV screen while viewing a program and offers the subscriber the option of taking the call using the existing remote control. The system would then go off hook and play over the home entertainment speakers. The system would also offer the ability to direct the call to the PWG where a customized greeting would play.

Figure 2:
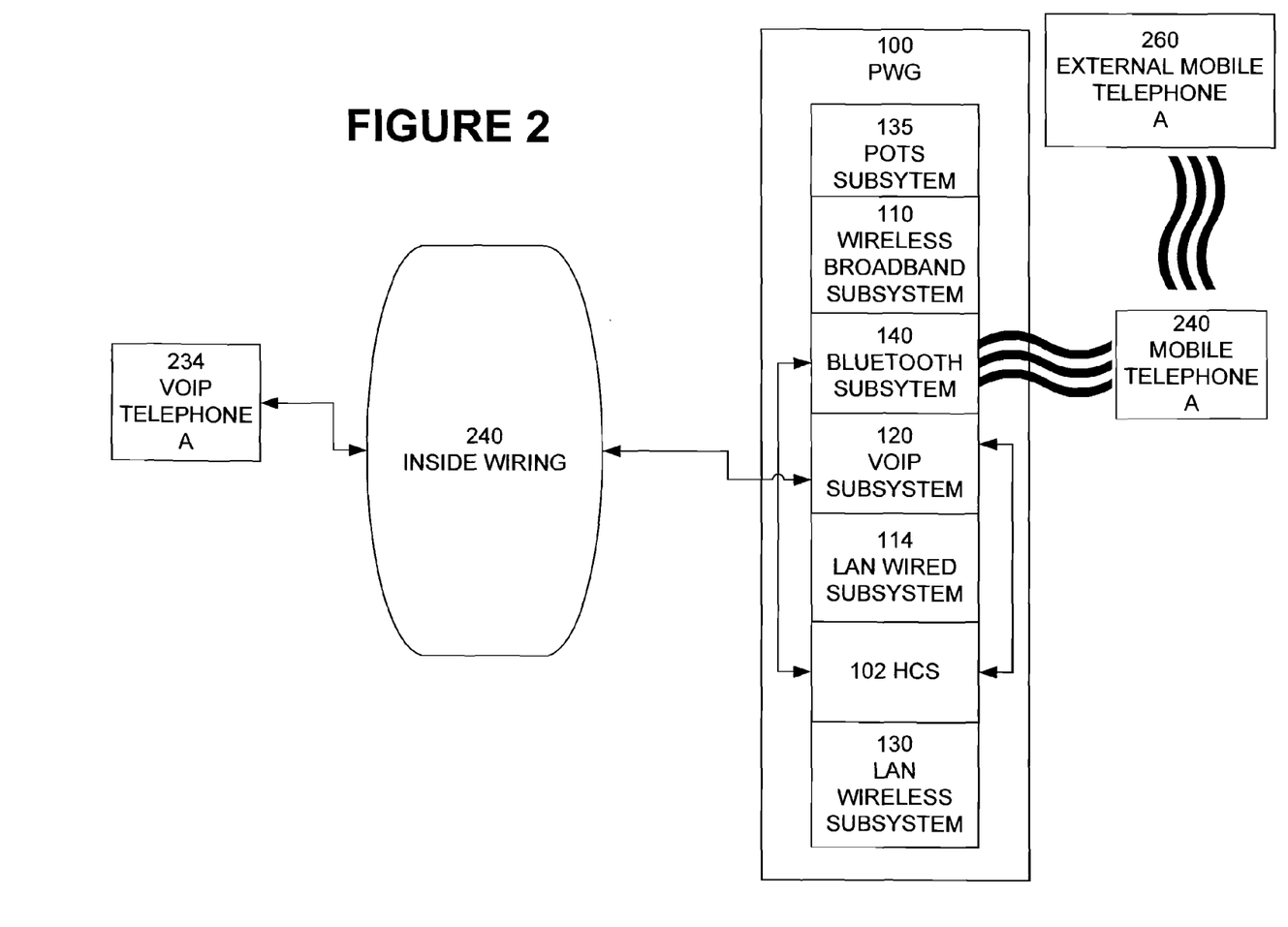
FIG. 2 illustrates a communication path through a PWG in which an in-bound call to a mobile telephone is directed to a VoIP communications device according to an embodiment.

FIG. 2 illustrates a communication path through a PWG in which an in-bound call to a mobile telephone is directed to a VoIP communications device according to an embodiment Referring to FIG. 2, a Bluetooth-compliant mobile telephone A 240 is configured to communicate with a PWG 100 via a Bluetooth subsystem 140. The VoIP subsystem 120 is connected to a VoIP telephone A 234 via the inside wiring 240. VoIP subsystem 120 communicates with Bluetooth subsystem 140 via HCS 102.

An external mobile telephone A 260 dials the number of mobile telephone A 240. The PWG 100 detects the incoming call and signals the VoIP telephone A 234 to ring. The call is answered by a subscriber (not illustrated) and communications between the calling external mobile telephone A 260 and VoIP telephone A 234 are bridged via the PWG 100 and mobile telephone A 240.

Figure 3:
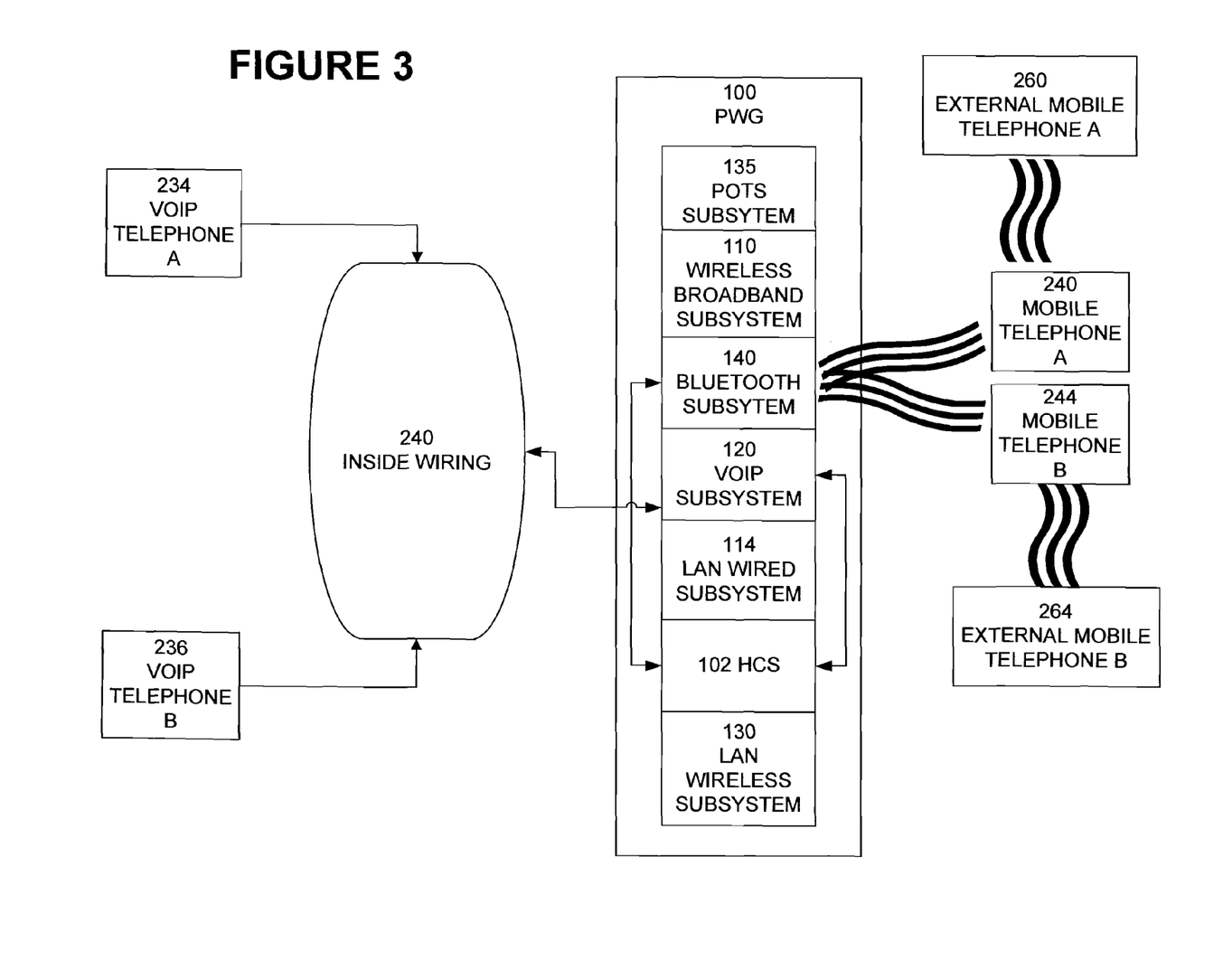
FIG. 3 illustrates a communication path through a PWG in which in-bound calls to two mobile telephones are directed to two separate VoIP communications devices according to an embodiment.

FIG. 3 illustrates a communication path through a PWG in which in-bound calls to two mobile telephones are directed to separate VoIP communications devices according to an embodiment. Referring to FIG. 3, a Bluetooth-compliant mobile telephone A 240 is configured to communicate with a PWG 100 via a Bluetooth subsystem 140. A Bluetooth-compliant mobile telephone B 244 is also configured to communicate with PWG 100 via Bluetooth subsystem 140.

The VoIP subsystem 120 is connected to VoIP telephone A 234 and VoIP telephone B 236 via the inside wiring 240. VoIP subsystem 120 communicates with Bluetooth subsystem 140 via HCS 102.

An external mobile telephone A 260 dials the number of the mobile telephone A 240. An external mobile telephone B 264 dials the number of the mobile telephone B 244. The PWG 100 detects the incoming call of the first call to arrive and selects VoIP telephone A 234 to ring. The selection of a telephone to ring is determined by pre-determined rules stored in management subsystem 125 (see, FIG. 1) and enforced by HCS 102. For example, a rule may direct HCS 102 to ring all telephones that are "on-hook." Another rule may direct HCS 102 to ring telephones in a specified order.

Referring again to FIG. 3, while external mobile telephone A 260 is connected to VoIP telephone A 234, external mobile telephone 264 dials mobile telephone B 244. The PWG 100 detects the second call and selects VoIP telephone B 236 to ring.

Figure 4:
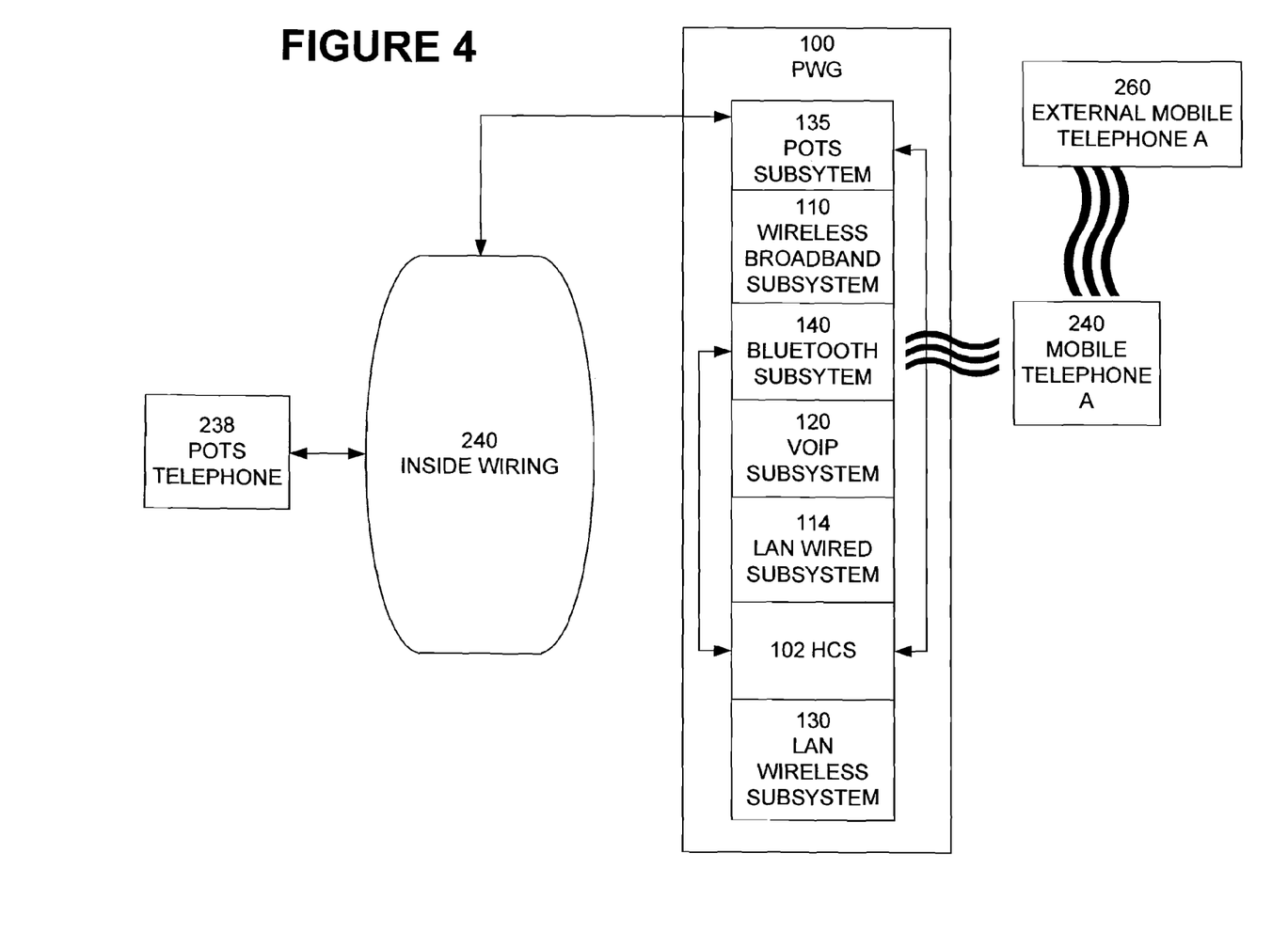
FIG. 4 illustrates a communication path through a PWG in which an in-bound call to a mobile telephone is directed to a POTS communications device according to an embodiment.

FIG. 4 illustrates a communication path through a PWG in which an in-bound call to a mobile telephone is directed to a POTS communications device according to an embodiment. Referring to FIG. 4, a Bluetooth-compliant mobile telephone A 240 is configured to communicate with a PWG 100 via a Bluetooth subsystem 140. A POTS subsystem 135 is connected to a POTS telephone 238 via the inside wiring 240. POTS subsystem 135 communicates with Bluetooth subsystem 140 via HCS 102.

An external mobile telephone A 260 dials the number of the mobile telephone A 240. The PWG 100 detects the incoming call and signals the POTS telephone 238 to ring. The call is answered by a subscriber (not illustrated) and communications between the external mobile telephone 260 and POTS telephone 238 are bridged via the PWG 100 and mobile telephone A 240.

Figure 5:
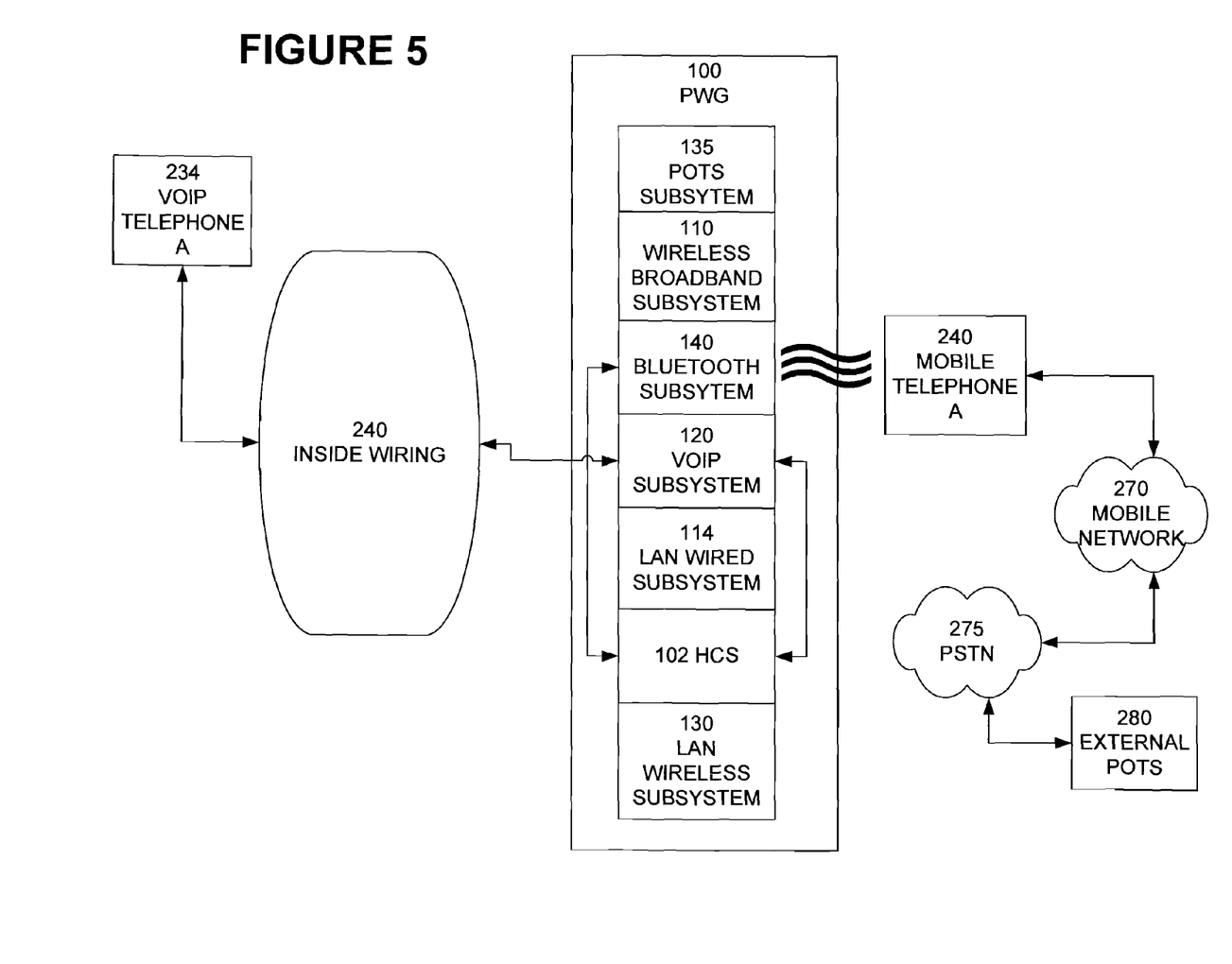
FIG. 5 illustrates a communication path through a PWG in which an out-bound telephone call to a POTS telephone originating from a VoIP communication device is directed to a mobile telephone for delivery to the PSTN according to an embodiment.

FIG. 5 illustrates a communication path through a PWG in which an out-bound telephone call to a POTS telephone originating from a VoIP communication device is directed to a mobile telephone for delivery to the PSTN according to an embodiment. Referring to FIG. 5, a Bluetooth-compliant mobile telephone A 240 is configured to communicate with a PWG 100 via a Bluetooth subsystem 140. A VoIP subsystem 120 is connected to a VoIP telephone A 234 via the inside wiring 240. VoIP subsystem 120 communicates with Bluetooth subsystem 140 via HCS 102.

VoIP telephone A 234 dials the number of external POTS 280. The PWG 100 detects the outbound call and routes the call the Bluetooth subsystem 140, which signals the mobile telephone A 240 to dial the POTS number. The call is routed to mobile network 270 where it is routed to the PSTN 275 and ultimately to external POTS 280.

In an alternate embodiment, management subsystem 125 (see FIG. 1) determines the status of each device connected to the PWG 100. In this embodiment, the PWG 100 enforces a rule that first attempts to direct outbound calls to mobile telephone A 240. If mobile telephone A 240 is in use and unavailable to provide outbound service, PWG 100 then directs the call to the CO/POTS subsystem 135. The call is placed directly over the PSTN 275 and received by external POTS 280.

Figure 6:
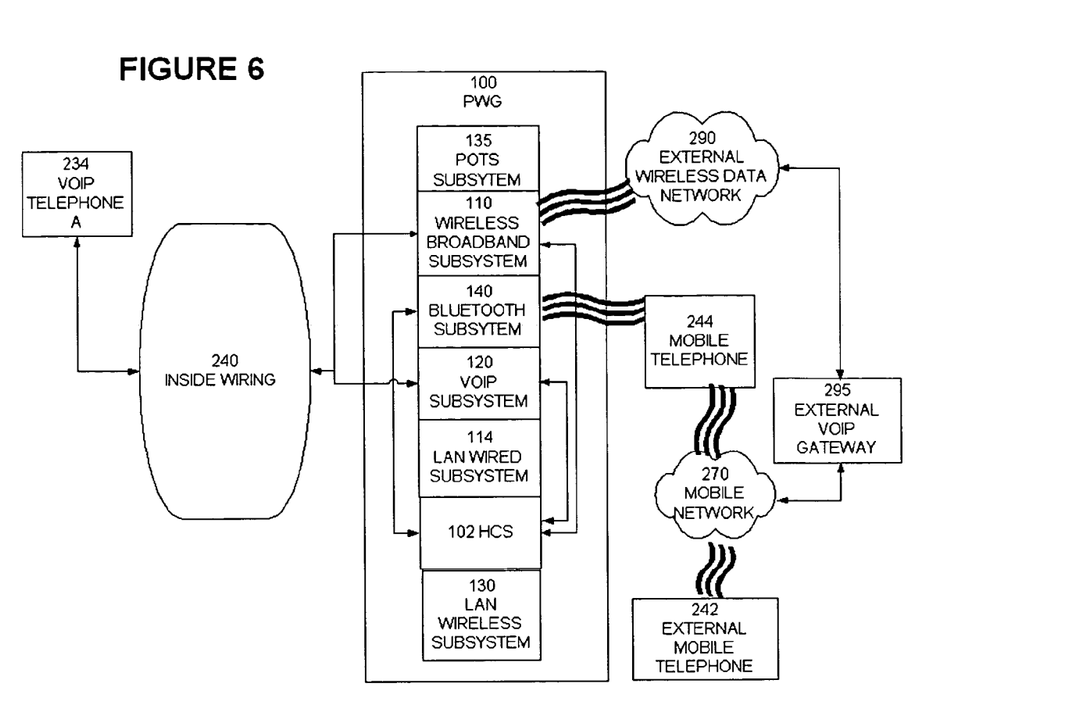
FIG. 6 illustrates two communication paths through a PWG in which an out-bound telephone call to a mobile telephone originating from a VoIP communication device is directed to a wireless data network for delivery to a mobile telephone system according to an embodiment.

Referring now to FIG. 6 two communication paths through a PWG in which an out-bound telephone call to a mobile telephone originating from a VoIP communication device is directed to a wireless data network for delivery to a mobile telephone system according to an embodiment. A call is originated from VoIP telephone A 234 over inside wiring 240 to an external telephone A 242. In an embodiment, the PWG 100 detects the outbound call and directs the call to wireless broadband subsystem 110. The wireless broadband subsystem 110 receives the VoIP packets from VoIP telephone 234 and sends those packets over external wireless data network 290. External wireless data network 290 routes the call through external VoIP gateway 295 to external mobile network 270. The call is then routed to external mobile telephone 242. If the broadband subsystem is 110 is not available, then the call is routed through mobile telephone 244 via Bluetooth subsystem 140. Mobile telephone 244 then converts the call to the wireless network 270. If this path to the Telephone 242 is not available (busy, out of range, utilized) then the call will be diverted to the PSTN network via the PTS subsystem 135.

In an embodiment, POTS Telephone 238 (see FIG. 4) initiates a call to another non-IP enable phone that is connected to another PWG in another location. The call is then directed to the wireless broadband connection via a predefined IP address for the far end phone and transmitted over the internet without the use of VoIP gateways. An example of this use would be where a college student has a PWG connected to the student's PC and the parents of the student also have one in their home. The far end phone can dial predefined code that the host subsystem will correlate to the IP address of the near end phone and connect the callers as if they went over the PSTN or regular VoIP network, In this embodiment the caller will not have to have a subscription to a VoIP provider such as Vonage, just an broadband connection to the internet.

Figure 7:
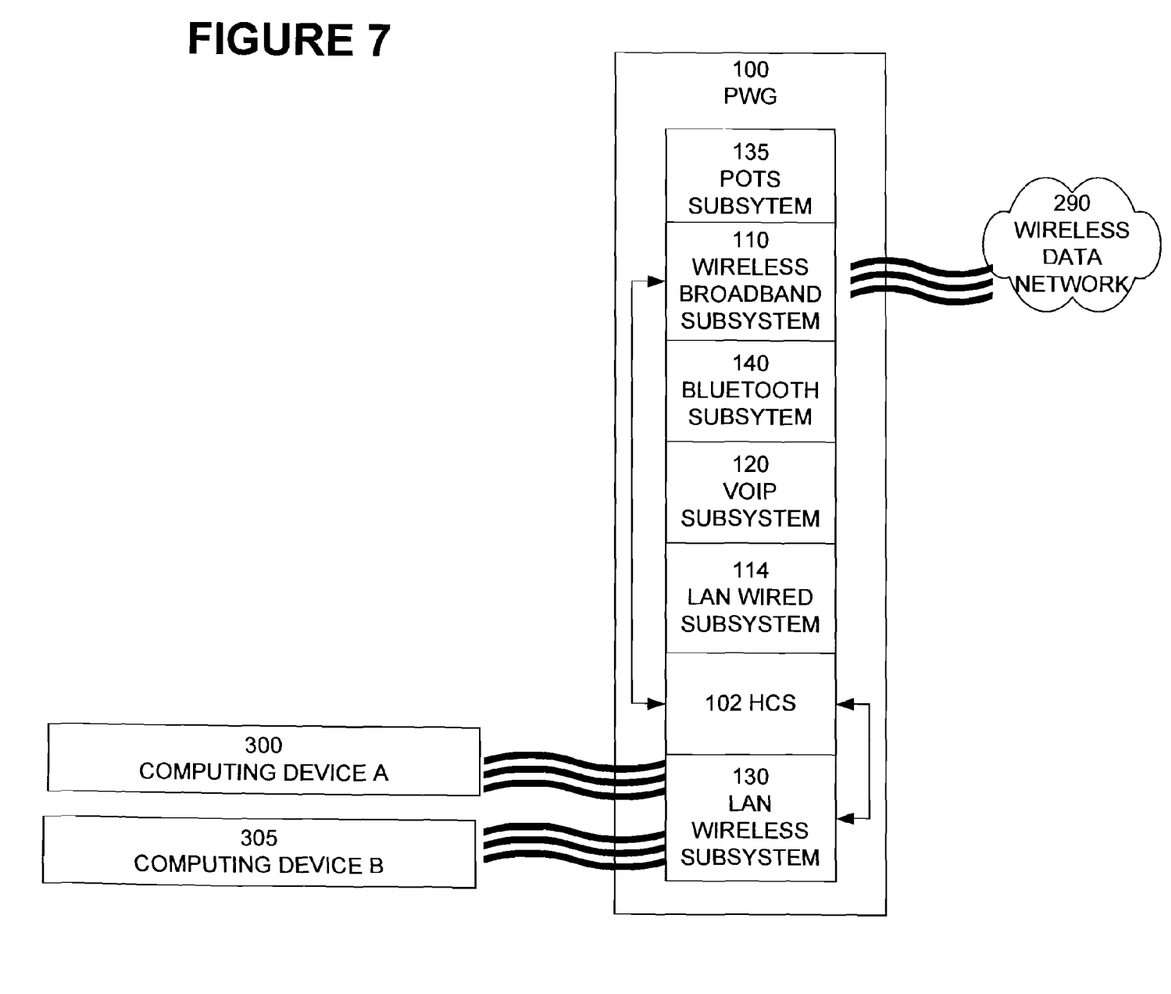
FIG. 7 illustrates a data communication path through a PWG in which a data link is established to a wireless broadband network according to an embodiment.

FIG. 7 illustrates a data communication path through a PWG in which a data link is established to a wireless broadband network according to an embodiment. Referring to FIG. 7, a PWG 100 is linked to a wireless computing device A 300 and a wireless computing device B 305 via wireless or wired LAN subsystem 130. Wired/Wireless LAN subsystem 130 communicates with wireless broadband subsystem 110 via HCS 102. Wireless broadband subsystem 110 provides connectivity to external wireless data network 290 for both wireless computing device A 300 and a wireless computing device B 305. PWG 100 thereby permits the sharing of the wireless broadband subsystem by multiple devices.

It will be understood by those skilled in the art that the methods and apparatuses may be embodied in other specific forms without departing from the scope hereof and that the examples and embodiments described herein are, in all respects, illustrative and not restrictive. Those skilled in the art will also recognize that other embodiments using the concepts described herein are also possible. Further, any reference to claim elements in the singular, for example, using the articles "a," "an," or "the" is not to be construed as limiting the element to the singular.

What is claimed is:

1. A personal wireless gateway comprising:
   a host controller subsystem adapted to communicate with communications subsystems and a management subsystem;
   a communications subsystem adapted to interface with a wireline communications device;
   a communications subsystem adapted to interface with a mobile communications device, wherein the host controller is adapted to bridge communications between the wireline communications device and the mobile communications device under control of the management subsystem;
   wherein said management subsystem is further adapted to determine mobile telephone network signal and battery strength of the mobile communications device,
   if the signal or battery strength is below a first threshold value, then:
   direct outbound calls to an alternative communications device;
   forward calls to the mobile communications device to the alternative communication device;
   monitor the incoming signal strength; and
   if the incoming signal strength is above a second threshold, then permit inbound calls to, and out-bound calls from, the mobile communications device.

2. The personal wireless gateway of claim 1, wherein the wireline communications device is selected from the group consisting of a public switched telephone network telephone and a voice over IP telephone.

3. The personal wireless gateway of claim 1, wherein the mobile communications device is selected from a mobile phone using TDMS, FDMA, CDMA, PCS, G3, and GSM.

4. The personal wireless gateway of claim 1 further comprising:
   a plain old telephones subsystem adapted to connect communications devices to the public switched telephone network (PSTN);
   a broadband subsystem adapted to connect packet communications devices to an IP network;
   a voice over IP (VoIP) subsystem adapted to link VoIP-enabled telephones to the personal wireless gateway; and
   a Bluetooth subsystem adapted to link Bluetooth-enabled devices to the personal wireless gateway.

5. The personal wireless gateway of claim 1, wherein the management subsystem is adapted to:
  receive and store user preferences, and
  bridge an outbound call from a calling communications device to a selected communications subsystem in accordance with the user preferences;
  communicate over the Internet with the user's chosen telecommunication carrier's switching elements, media gateways and back office systems.

6. The personal wireless gateway of claim 5 wherein the back office systems comprise a billing system.

7. The personal wireless gateway of claim 6 wherein the billing system comprises instructions for zone pricing.

8. The personal wireless gateway of claim 1, wherein the management subsystem is further adapted to:
  store location identifying information;
  detect the outbound dialing of an emergency assistance service; and
  play a voice message comprising the location identifying information.

9. The personal wireless gateway of claim 8, wherein the emergency assistance service is a "911" operator.

10. The personal wireless gateway of claim 1, wherein the subscriber information collected during the log on process with the subscriber is automatically forwarded to the carrier of choice.

11. The personal wireless gateway of claim 1, wherein the subscriber information collected during the log on process with the subscriber is retrieved on a proactive basis by the carrier.

12. The personal wireless gateway of claim 1, wherein the subscriber of the PWG comprises software adapted to customize the dial tone for the PWG, customize the greeting the caller hears when identified in the list entered into the management screens, and download, store and pay ringtones according to the users preferences configured in the management subsystem.

13. A personal wireless gateway comprising:
  a host controller subsystem adapted to communicate with communications subsystems and a management subsystem;
  a communications subsystem adapted to interface with a wireline communications device;
  a communications subsystem adapted to interface with a mobile communications device wherein the host controller is adapted to bridge communications between the wireline communications device and the mobile communications device under control of the management subsystem;
  wherein the management subsystem is further adapted to:
  store location identifying information;
  detect the outbound dialing of an emergency assistance service; and
  play a voice message comprising the location identifying information at predefined intervals.

14. The personal wireless gateway of claim 13, wherein the wireline communications device is selected from the group consisting of a public switched telephone network telephone and a voice over IP telephone.

15. The personal wireless gateway of claim 13, wherein the mobile communications device is selected from a mobile phone using TDMS, FDMA, CDMA, PCS, G3, and GSM.

16. The personal wireless gateway of claim 13 further comprising:
  a plain old telephones subsystem adapted to connect communications devices to the public switched telephone network (PSTN);
  a broadband subsystem adapted to connect packet communications devices to an IP network;
  a voice over IP (VoIP) subsystem adapted to link VoIP-enabled telephones to the personal wireless gateway; and
  a Bluetooth subsystem adapted to link Bluetooth-enabled devices to the personal wireless gateway.

17. The personal wireless gateway of claim 13, wherein the management subsystem is adapted to:
  receive and store user preferences, and
  bridge an outbound call from a calling communications device to a selected communications subsystem in accordance with the user preferences;
  communicate over the Internet with the users chosen telecommunication carrier's switching elements, media gateways and back office systems.

18. The personal wireless gateway of claim 17 wherein the back office systems comprise a billing system.

19. The personal wireless gateway of claim 18 wherein the billing system comprises instructions for zone pricing.

20. The personal wireless gateway of claim 13, wherein the management subsystem is further adapted to:
  store location identifying information;
  detect the outbound dialing of an emergency assistance service; and
  play a voice message comprising the location identifying information.

21. The personal wireless gateway of claim 20, wherein the emergency assistance service is a "911" operator.

22. The personal wireless gateway of claim 13, wherein the subscriber information collected during the log on process with the subscriber is automatically forwarded to the carrier of choice.

23. The personal wireless gateway of claim 13, wherein the subscriber information collected during the log on process with the subscriber is retrieved on a proactive basis by the carrier.

24. The personal wireless gateway of claim 13, wherein the subscriber of the PWG comprises software adapted to customize the dial tone for the PWG, customize the greeting the caller hears when identified in the list entered into the management screens, and download, store and pay ringtones according to the users preferences configured in the management subsystem.

25. A personal wireless gateway comprising:
  a host controller subsystem adapted to communicate with communications subsystems and a management subsystem:
  a communications subsystem adapted to interface with a wireline communications device;
  a communications subsystem adapted to interface with a mobile communications device wherein the host controller is adapted to bridge communications between the wireline communications device and the mobile communications device under control of the management subsystem;
  wherein the management subsystem is further adapted to:
  store location identifying information;
  detect the outbound dialing of an emergency assistance service;
  determine whether a caller is in voice communication with the emergency assistance service; and
  if the caller is not in voice communication with the emergency assistance service, play a voice message comprising the location identifying information.

26. The personal wireless gateway of claim 25, wherein the wireline communications device is selected from the group consisting of a public switched telephone network telephone and a voice over IP telephone.

27. The personal wireless gateway of claim 25, wherein the mobile communications device is selected from a mobile phone using TDMS, FDMA, CDMA, PCS, G3, and GSM.

28. The personal wireless gateway of claim 25 further comprising:
   a plain old telephones subsystem adapted to connect communications devices to the public switched telephone network (PSTN);
   a broadband subsystem adapted to connect packet communications devices to an IP network;
   a voice over IP (VoIP) subsystem adapted to link VoIP-enabled telephones to the personal wireless gateway; and
   a Bluetooth subsystem adapted to link Bluetooth-enabled devices to the personal wireless gateway.

29. The personal wireless gateway of claim 25, wherein the management subsystem is adapted to:
   receive and store user preferences, and
   bridge an outbound call from a calling communications device to a selected communications subsystem in accordance with the user preferences;
   communicate over the Internet with the users chosen telecommunication carrier's switching elements, media gateways and back office systems.

30. The personal wireless gateway of claim 29 wherein the back office systems comprise a billing system.

31. The personal wireless gateway of claim 30 wherein the billing system comprises instructions for zone pricing.

32. The personal wireless gateway of claim 25, wherein the management subsystem is further adapted to:
   store location identifying information;
   detect the outbound dialing of an emergency assistance service; and
   play a voice message comprising the location identifying information.

33. The personal wireless gateway of claim 32, wherein the emergency assistance service is a "911" operator.

34. The personal wireless gateway of claim 25, wherein the subscriber information collected during the log on process with the subscriber is automatically forwarded to the carrier of choice.

35. The personal wireless gateway of claim 25, wherein the subscriber information collected during the log on process with the subscriber is retrieved on a proactive basis by the carrier.

36. The personal wireless gateway of claim 25, wherein the subscriber of the PWG comprises software adapted to customize the dial tone for the PWG, customize the greeting the caller hears when identified in the list entered into the management screens, and download, store and pay ringtones according to the users preferences configured in the management subsystem.

* * * * *